United States Patent [19]

Iseman et al.

[11] Patent Number: 5,347,188

[45] Date of Patent: Sep. 13, 1994

[54] ELECTRIC MACHINE WITH ENHANCED LIQUID COOLING

[75] Inventors: Walter J. Iseman, Monroe Center; Michael G. Schneider, Rockford; William Schumacher, Oregen; Patrick J. Murray; Roger J. Collings, both of Rockford, all of Ill.

[73] Assignee: Sunstrand Corporation, Rockford, Ill.

[21] Appl. No.: 942,248

[22] Filed: Sep. 9, 1992

[51] Int. Cl.$^5$ .............. H02K 11/00; H02K 9/00; H02K 9/19; H02K 1/32

[52] U.S. Cl. .............. 310/68 D; 310/54; 310/61

[58] Field of Search ........ 310/52, 54, 58, 59, 310/61, 64, 68 D; 363/126, 141, 145

[56] References Cited

U.S. PATENT DOCUMENTS

| | | | |
|---|---|---|---|
| 2,285,960 | 6/1942 | Fechheimer | 171/252 |
| 2,353,336 | 7/1944 | Heintz et al. | |
| 2,698,911 | 1/1955 | Schaefer | 310/86 |
| 2,897,383 | 7/1959 | Barrows et al. | 310/68 D |
| 2,967,960 | 1/1961 | Waldschmidt | 310/86 |
| 2,975,309 | 3/1961 | Seidner | 310/54 |
| 3,075,103 | 1/1963 | Ward, Jr. | 310/54 |
| 3,145,314 | 8/1964 | Becker | 310/68 |
| 3,249,775 | 3/1966 | Baylac | 310/54 |
| 3,440,461 | 4/1969 | Potter | 310/54 |
| 3,461,331 | 8/1969 | Pannell | 310/68 D |
| 3,629,627 | 12/1971 | Dafler | 310/52 |
| 3,727,085 | 4/1973 | Goetz et al. | 310/54 |
| 4,227,108 | 10/1980 | Washizu et al. | 310/214 |
| 4,323,803 | 4/1982 | Danko et al. | 310/59 |
| 4,356,700 | 11/1982 | Eckels et al. | 310/64 |
| 4,413,201 | 11/1983 | Nikitin et al. | 310/260 |
| 4,445,056 | 4/1984 | Gaylord | 310/54 |
| 4,492,889 | 1/1985 | Fukushi et al. | 310/87 |
| 4,581,695 | 4/1986 | Hoppe | 363/145 |
| 4,603,344 | 7/1986 | Trommer | 357/76 |
| 4,647,805 | 3/1987 | Flygare et al. | 310/61 |
| 4,729,160 | 3/1988 | Brown | 29/598 |
| 4,794,510 | 12/1988 | Wege | 363/145 |
| 4,797,588 | 1/1989 | Capios | 310/54 |
| 4,797,590 | 1/1989 | Raad et al. | 310/68 D |
| 4,808,873 | 2/1989 | Rowe et al. | 310/260 |
| 4,864,173 | 9/1989 | Even | 310/93 |
| 4,896,062 | 1/1990 | Pollard | 310/68 |
| 5,003,207 | 3/1991 | Krinickas et al. | 310/52 |
| 5,223,757 | 6/1993 | Staub et al. | 310/54 |
| 5,237,227 | 8/1983 | Huss | 310/54 |

FOREIGN PATENT DOCUMENTS 526988 11/1976 U.S.S.R. .............. 310/68 D

*Primary Examiner*—Kristine L. Peckman
*Assistant Examiner*—C. LaBelle
*Attorney, Agent, or Firm*—Antonelli, Terry, Stout & Kraus

[57] ABSTRACT

The present invention is a liquid cooled electric machine (10) having enhanced cooling of the end turns (22) by providing intimate contact between the end turns and coolant fluid flowing through a first annular flow channel (34) and a second annular flow channel (50). Furthermore, a cylindrical liner (62) which is force fit within the annulus of the stator 12 forms part of the first and second annular flow channels and further provides support against radially inward deflection of the end turns (22). Furthermore, the invention is a cooling system (200) for an exciter generator in a self-excited electric power generator which has a liquid coolant circuit (216) which splits coolant flow between an inside surface (222) of a fullwave rectifier assembly (214) and an outside surface (226) of the fullwave rectifier assembly which absorbs heat from the rotor of the exciter generator.

6 Claims, 8 Drawing Sheets

ELECTRIC MACHINE WITH ENHANCED LIQUID COOLING

CROSS-REFERENCE TO RELATED APPLICATION

Reference is made to U.S. Pat. No. 5,237,227 entitled "Exciter Rotor Flow Through Cooling". An exciter rotor assembly is disclosed therein which utilizes a cylindrical non-electrically conductive containment sleeve which is press fit in surface contact with coaxial rotors so that the rotors fit within the sleeve and are supported to provide hoop strength against rotational stresses provided by the high rates of revolution of the rotors which are used in alternating current electric power generators in airframes. The exciter rotor oil flows in a coolant circuit that cools windings of the main generator rotor and windings of the exciter rotor which is contained radially inward of the air gap to reduce windage losses when compared to windage losses caused by spray cooling of the rotor windings of the exciter rotor as in the prior art. The containment sleeve and an end cap produce a pool of coolant liquid in which the windings of the exciter rotor are immersed to produce enhanced cooling when compared to that produced in the prior art by spraying coolant liquid on the rotor windings of the exciter generator. While the containment sleeve results in increased spacing between the field windings and the main windings of the exciter, the: increased cooling provided to the exciter permits higher current densities to be utilized so that the size of the exciter rotor is not increased.

TECHNICAL FIELD

The present invention relates to liquid cooled electric machines and, more particularly, to self-excited motors and generators.

BACKGROUND ART

High performance generator and motor designs reject waste heat into liquid flowing through the stator slots. Contact of the liquid with the magnetically permeable material of the stator slots and the electrical windings produces a modest convection heat transfer coefficient. On the other hand, the end turns which are the projection of the stator pole windings axially outward from the magnetically permeable stator core containing the slots are difficult to cool as a consequence of the difficulty in directing cooling fluid in intimate contact with the irregular geometry of the windings. As a result, the heat transfer coefficient between the cooling liquid and the end turns is less than that between the cooling liquid and the slots. As a result, the end turns operate at a higher temperature than the slot.

As a consequence of vibration, it is necessary to support the end turns mechanically to prevent their radially inward and outward vibration which can result in failure of the insulation of the windings leading to potential shorts or other electrical problems. Typically, the end turns are mechanically supported with a potting compound and cord. These methods require substantial labor and have a cost impact on the cost of fabricating a motor or generator.

U.S. Pat. Nos. 2,285,960, 2,975,309, 3,075,103, 4,227,108, 4,323,803 and 4,797,588 disclose fluid cooled stators with fluid contacting the end turns. Only U.S. Pat. No. 2,975,309 supports the end turns against deflection radially inward and outward by potting with insulating material. In the '309 patent, fluid is transmitted through a hollow center portion of the conductors and further in passages offset from the slots through the center of the stator. Conduction of the fluid through the center of a hollow conductor provides less surface area for heat transfer than intimate contact with the outside surfaces of the end turns which provides for a more efficient heat transfer.

Containment sleeves have been used in the prior art to prevent cooling fluid from flowing into the air gap between the stator and the rotor. Cooling liquid, such as oil in the air gap, creates windage losses which reduces the overall efficiency of operation of an electric machine. Self-excited electric power generators of the type utilized in airframes use a permanent magnet generator to generate the electric field in the stator of an exciter with the exciter rotor producing three phase alternating current which is rectified by a rotating three phase rectifier assembly rotating with the exciter rotor to produce DC used for creating the electric field in the main generator. For electric machines having high output it is necessary for the exciter rotor to produce high current outputs for generating the necessary current which is rectified by the rectifier assembly to create the electric field for the main generator. In the prior art, one cooling technique is to spray the windings of the rotor with oil to reduce the heat flux produced by the rotor windings. This technique has the disadvantage of creating windage losses in the air gap between the exciter, stator and rotor.

The three phase fullwave rectifier of a self-excited electric power generator is typically mounted inside the annulus of the exciter rotor. Cooling fluid, such as cooling oil, is circulated through the interior of the rotor assembly.

Sleeves mounted between the stator and rotor of an electric machine are known. U.S. Pat. No. 2,698,911 discloses a stator sleeve which is inserted within the sleeve in the air gap between the stator and the rotor. The stator sleeve is made from stainless steel. The purpose of the sleeve is to prevent water from entering the stator. The sleeve is designed to be rigid to prevent bulging due to heat generated in the motor or to pressure of the oil or plastic material utilized to fill interstices in the windings. U.S. Pat. No. 2,967,960 discloses a submersible motor having a stainless steel liner disposed within the annulus of the stator in a manner similar to that disclosed in U.S. Pat. No. 2,698,911 discussed above. U.S. Pat. No. 3,727,085 discloses a stator sleeve which is formed from a high temperature non-conductive and non-magnetic material which may be a wound fiberglass material which is impregnated by a high temperature epoxy resin as a binding agent. U.S. Pat. No. 4,492,889 discloses a submersible motor having a sleeve which lines the interior of the annulus of the stator which is fabricated from carbon fiber reinforced plastic. Furthermore, the '889 patent discloses that the stator sleeve may be manufactured from plastic reinforced with glass or metal fibers. The stator sleeve of the '889 patent is not disclosed as having a multiple laminar structure nor is orientation of reinforcing fibers disclosed. U.S. Pat. No. 4,729,160 discloses a composite sleeve for an electric motor which is bonded to the rotor of a motor.

DISCLOSURE OF INVENTION

The present invention is a liquid cooled electric machine having a stator with slots running axially through the stator for containing stator windings which have end turns extending axially outward from the stator slots which provides high efficiency cooling for the end turns and the windings within the slots and further is a cooling system for an exciter generator for use in a self-excited electric power generator which provides high efficiency cooling for the rotor of the exciter generator. The invention utilizes a cooling liquid, such as oil, which flows in intimate contact with the end turns and further which flows through the interior of a fullwave rectifier assembly for rectifying alternating current produced by the exciter rotor in thermal contact with a hollow shaft on which the exciter rotor is mounted and further along the outside surface of the fullwave rectifier assembly to function as a heat sink for heat thermally coupled to the cooling liquid which flows radially inward from the exciter rotor. The rotation of the rectifier assembly which is mounted within a hollow shaft on which the exciter rotor is mounted produces a natural convection as a consequence of the centrifugal acceleration of the cooling medium causing the denser cooler liquid cooling medium to continually flow outward in thermal contact with the inner diameter of the thermal coupling with the exciter rotor.

The intimate contact of the cooling liquid with the end turns is produced by the combination of a first annular flow channel connected to the end turns extending from one end of the stator along the end turns to which an inlet manifold is connected having an inner axially extending circumferential surface contacting an inner axially extending circumferential surface of the end turns and an outer axially extending circumferential surface contacting an outer axially extending circumferential surface of the end turns to guide cooling fluid through the first channel in contact with the end turns and a second annular flow channel connected to the end turns extending from another end of the stator along the end turns to which an outlet manifold is connected having an inner axially extending circumferential surface contacting an inner axially extending circumferential surface of the end turns and an outer axially extending circumferential surface contacting an outer axially extending circumferential surface of the end turns to guide the cooling fluid through the second channel in contact with the end turns. First and second seals respectively contact the end turns at a point of entry into respective ends of each slot for preventing flow into the slot outside the first annular flow channel and the second annular flow channel. A cylindrical electrically non-conductive magnetically permeable sleeve is mounted in a cylindrical opening within the stator for containing the cooling fluid and preventing fluid from flowing into an air gap disposed between the stator and the rotor of the machine with the sleeve extending outward from the stator which also comprises part of the first and second flow channels. The sleeve has a coefficient of thermal expansion matched to a coefficient of thermal expansion of the stator in a radial or axial direction. The sleeve contains cooling fluid within the stator and prevents fluid from flowing within an air gap between the stator and the rotor and comprises a plurality of cylindrical laminations with each lamination having an angular orientation defined by an angle between reinforcing fiber in each lamination and an axis of revolution of the sleeve; a first lamination and a third lamination of the plurality of laminations respectively having an angular orientation of the reinforcing fiber with respect to the axis within a first range with one of the first and third laminations having a positive angle defined by the reinforcing fiber with respect to the axis and another of the first and third laminations having a negative angle defined by the reinforcing fiber with respect to the axis; and a second lamination of the plurality of laminations having an angular orientation of the reinforcing fiber with respect to the axis in a second range exclusive of the first range. The laminations may comprise a fiber reinforcing thermoset tape such as glass reinforced epoxy resin tape. The first range may be 80° ±5° and −80° ±5° and the second range may be 0° ±2°. The second lamination is disposed between the first and third laminations and has a radially thickness of 30%–35% of the total radial thickness of the sleeve measured from an inner diameter to the outer diameter. The first and third laminations withstand a predetermined hoop stress applied to an outer surface of the sleeve contacting the stator caused by cooling fluid flowing within the stator and by an interference fit and the second lamination withstands a predetermined axial load for producing the interference of the sleeve within the cylinder.

The annular flow channels also provide radial support to the end turns to dampen vibration of the end turns radially inward and radially outward. The annular flow channels comprise a heat cured circumferential tape wrapped around the outer axially extending circumferential surface of the end turns or, alternatively, a collar contacting the outer axially extending circumferential surface of the end turns having a recess for holding a current transformer for sensing current flowing the windings of the stator. The annular flow channels comprise an axially extending circumferential wedge member having an axially extending surface in contact with the cylindrical sleeve and an outer axially extending surface contacting the outer axially extending circumferential surface of the end turns.

The cooling system for the exciter generator utilizes a liquid cooling circuit for receiving coolant liquid flowing axially along a shaft containing a fullwave rectifier assembly for rectifying alternating current produced by the exciter rotor in thermal contact with the hollow shaft and splitting flow between flow axially through the inside of the hollow shaft in thermal contact with diodes in the diode assembly and flow radially outward to a flow path between an outside surface of the diode assembly and an inside surface of the hollow shaft axially along the diode assembly to absorb heat generated by the exciter rotor. The flow path further extends radially inward from the flow path between the outside surface of the diode assembly and the inside surface of the hollow shaft to the inside of the hollow shaft. The radially outward flow and the radially inward flow is respectively through apertures disposed at opposed ends of the diode assembly between an inside surface of the diode assembly and an outside surface of the diode assembly. The axial flow path has a helical flow channel defined by a helical projection extending radially outward from the outside surface which contacts the inside surface of the hollow shaft with one end of the helical flow channel in fluid communication with the apertures receiving outward liquid coolant flow and another end of the helical flow channel being in fluid communication with the apertures receiving radially inward coolant flow.

A liquid cooled electric machine having a stator with slots running axially through the stator for containing stator windings which have end turns extending axially outward from the slots in accordance with the invention includes a liquid inlet connected to an inlet manifold connected to one end of the stator for receiving cooling liquid to be circulated through the end turns and windings and through the slots; a liquid outlet connected to an outlet manifold connected to another end of the stator for discharging cooling liquid which has circulated through the end turns and windings; a first annular flow channel connected to the end turns extending from the one end of the stator along the end turns to which the inlet manifold is connected having an inner axially extending circumferential surface contacting an inner axially extending circumferential surface of the end turns and an outer axially extending circumferential surface contacting an outer axially extending circumferential surface of the end turns to guide cooling fluid through the first channel in contact with the end turns; and a second annular flow channel connected to the end turns extending from the other end of the stator along the end turns to which the outlet manifold is connected having an inner axially extending circumferential surface contacting an inner axially extending circumferential surface of the end turns and an outer axially extending circumferential surface contacting an outer axially extending circumferential surface of the end turns to guide cooling fluid through the second channel in contact with the end turns. A first seal is connected to the one end of the stator and contacts the end turns at a point of entry into each slot for preventing flow into the slot outside the first annular flow channel and a second slot is connected to the other end of the stator and contacts the end turns at a point of entry into each slot for preventing flow from the slot outside the second annular channel. A cylindrical nonconductive nonmagnetically permeable sleeve is mounted in a cylindrical opening within the stator for containing the cooling fluid from flowing into an air gap disposed between the stator and the rotor of the machine with the sleeve extending outward from the stator and comprising part of the first and second annular flow channels. The first and second annular flow channels provide radial support to the end turns to dampen vibration of the end turns radially inward and radially outward. The annular flow channels comprise a heat cured circumferential tape wrapped around the outer axially extending circumferential surface of the end turns or a collar contacting the outer axially extending circumferential surface of the end turns having a recess for holding a current transformer for sensing current flowing in the windings of the stator. The first and second annular channels comprise an axially extending circumferential wedge member having an inner axially extending surface in contact with the cylindrical nonconductive sleeve and an outer axially extending surface contacting the inner axially extending circumferential surface of the end turns.

A cooling system for an exciter generator for use in a self-excited electric power generator in accordance with the invention includes a hollow shaft containing a fullwave rectifier assembly for rectifying alternating current produced by an exciter rotor in thermal contact with the hollow shaft; a liquid coolant circuit for receiving coolant liquid flowing axially along the shaft and splitting flow between flow axially through the inside of the hollow shaft in thermal contact with diodes in the diode assembly and flow radially outward to a flow path between an outside surface of the diode assembly and an inside surface of the hollow shaft axially along the diode assembly to absorb heat generated by the exciter rotor. The coolant circuit further comprises a flow path extending radially inward from the flow path between the outside surface of the diode assembly and the inside surface of the hollow shaft to the inside of the hollow shaft. The radially outward flow and radially inward flow is respectively through apertures disposed at opposed ends of the diode assembly between an inside surface of the diode assembly and an outside surface of the diode assembly. The axial flow path further comprises a helical flow channel defined by a helical projection extending radially outward from the outside surface which contacts the inside surface of the hollow shaft with one end of the helical flow channel in fluid communication with apertures receiving outward liquid coolant flow and another end of the helical flow channel being in fluid communication with apertures receiving radially inward coolant flow. A thermally conductive sleeve is disposed between an inside diameter of the exciter rotor and an outside diameter of the hollow shaft.

BEST MODE FOR CARRYING OUT THE INVENTION

Figure 1:
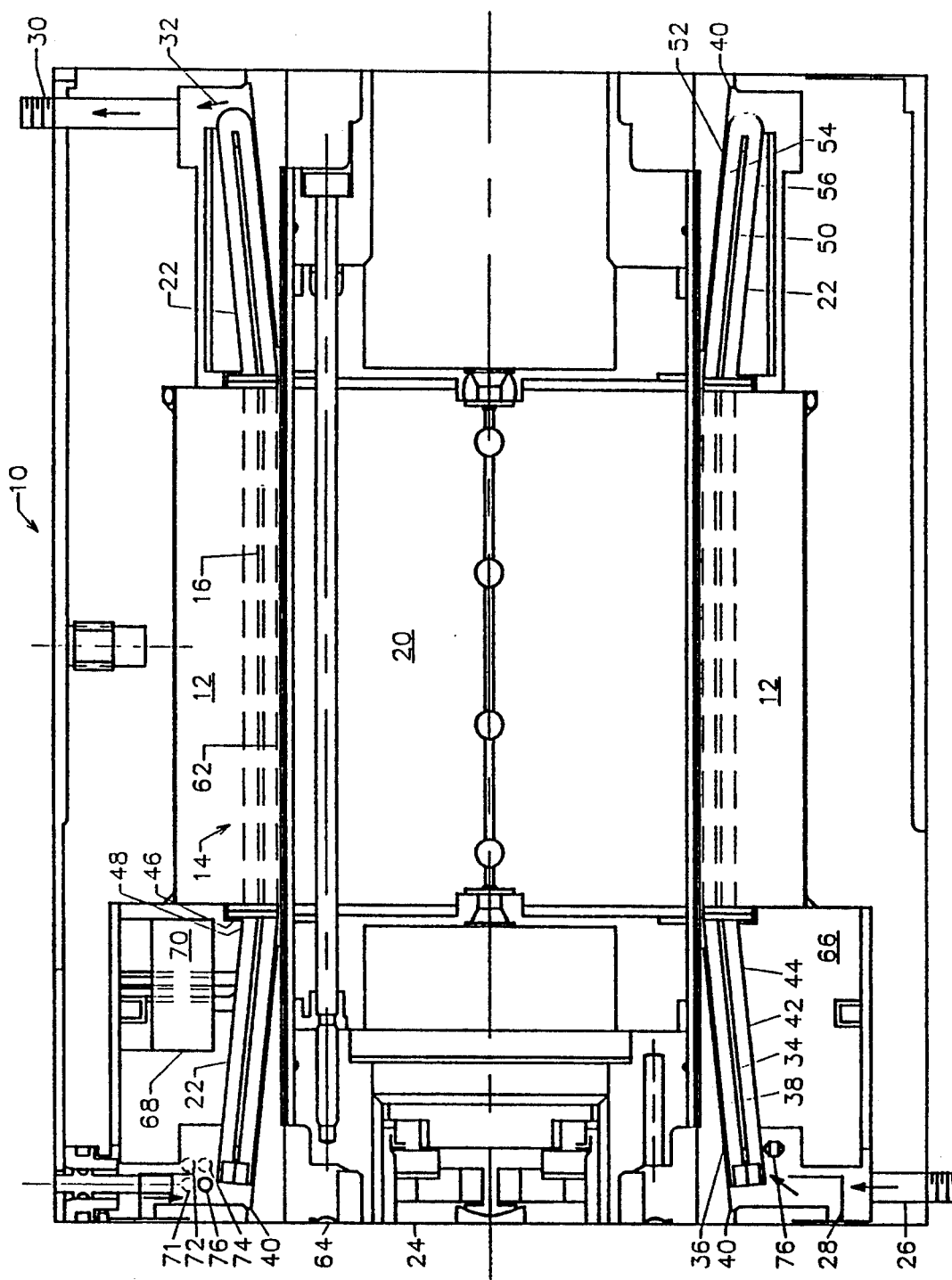
FIG. 1 illustrates a first embodiment of a cooling system for end turns of an electric machine in accordance with the present invention.
Figure 2:
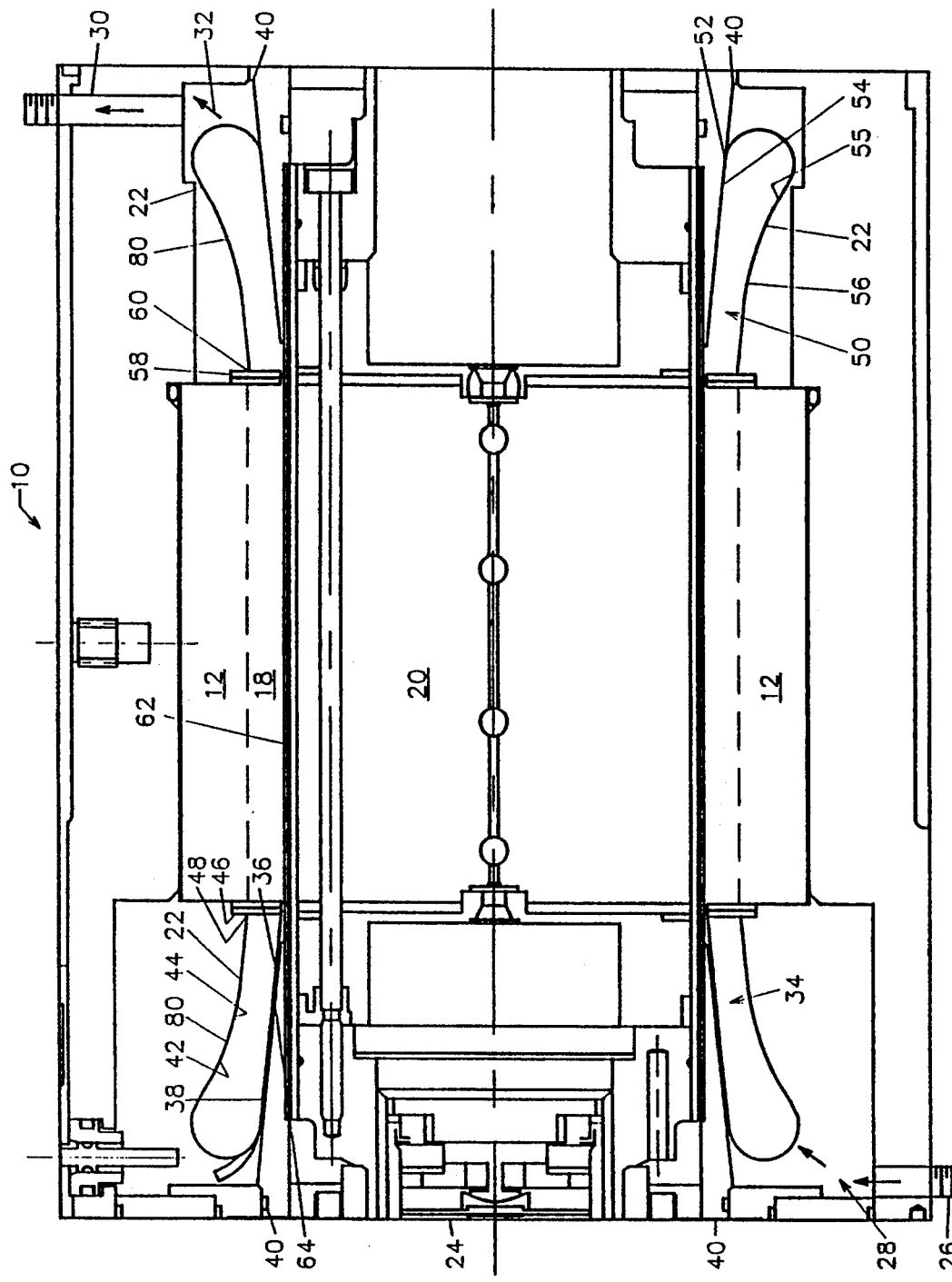
FIG. 2 illustrates a second embodiment of a cooling system for end turns of an electric machine in accordance with the present invention.
Figure 3:
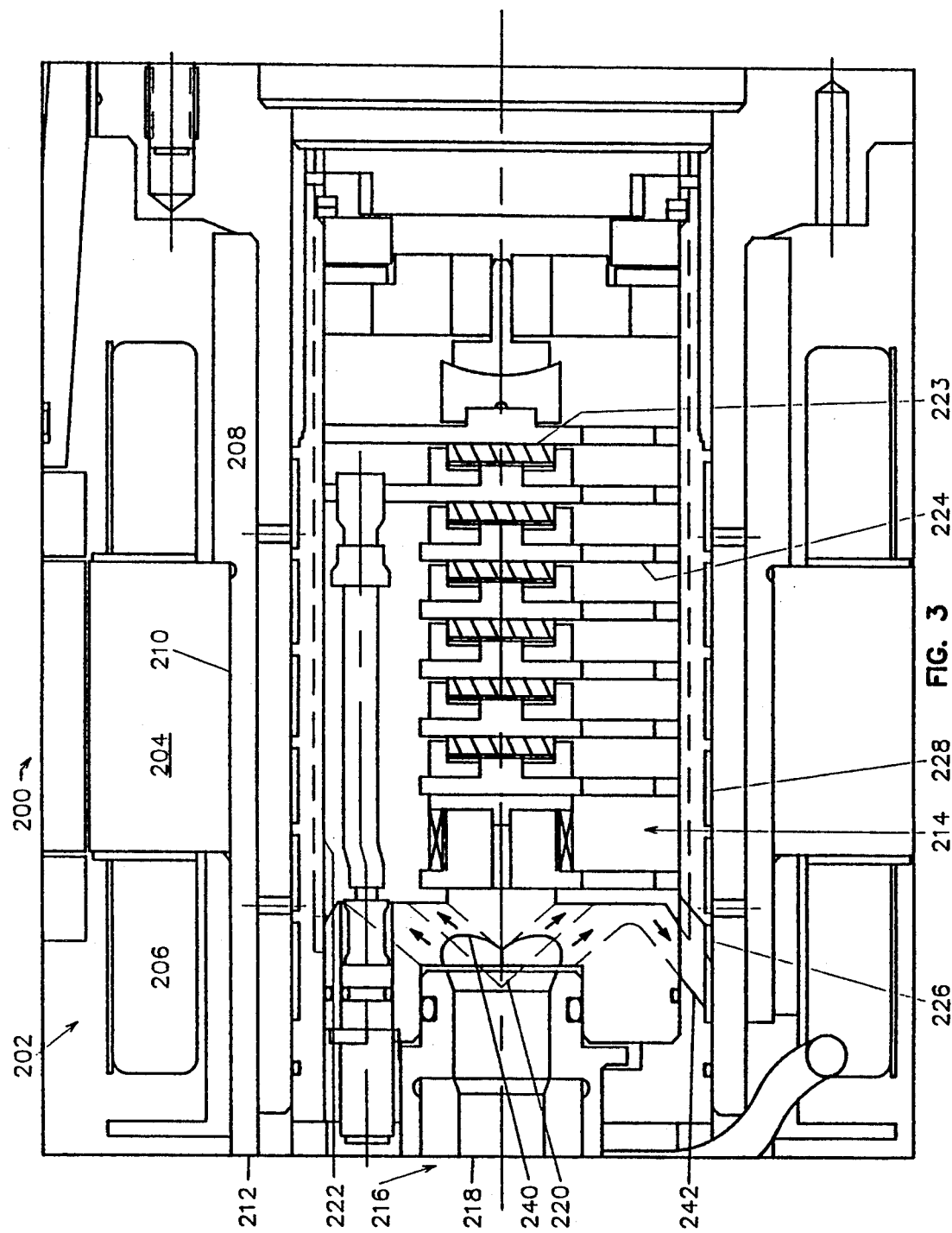
FIG. 3 illustrates a cooling system for an exciter generator in accordance with the present invention.
Figure 4:
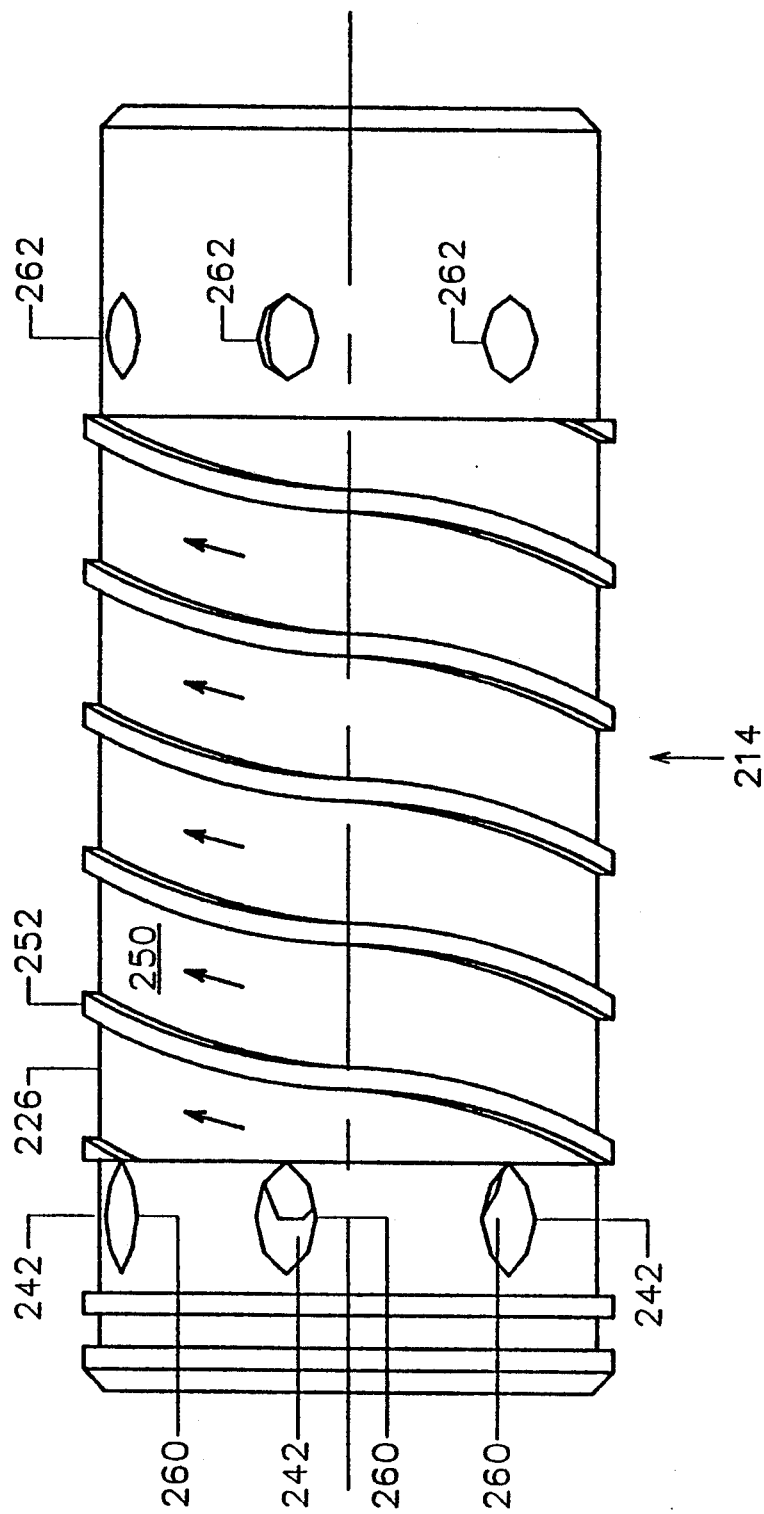
FIG. 4 illustrates a view of a fullwave rectifier assembly of the exciter generator of FIG. 3.

FIGS. 1 and 2 illustrate first and second embodiments of a liquid cooled electric machine having a stator 12 containing slots 14 which contain individual windings 16 having a rectangular cross section, as illustrated in FIG. 1, or multiple strand windings 18. The generator also contains a rotor 20 of conventional construction such as that used in a self-excited three phase 400 Hz. electrical power generator used in airframes manufactured by the Assignee of the present invention. The structure of the stator 12 and rotor 20 may be conventional in accordance with that utilized in commercial products of the Assignee of the present invention and is not limited to any particular design of a main generator comprised of the stator 12 and rotor 20. It should be understood that if the present invention is used in a self-excited generator a permanent magnet generator and exciter are present which are not illustrated in FIGS. 1 and 2. An exciter generator which may be used in accordance with the invention is illustrated in FIGS. 3 and 4 as described below. End turns 22 extend axially outward from the slots 14. A problem in the prior art which the present invention solves is providing support against the end turns 22 which are cantilevered out over the outboard extensions of the stator 12 to protect against inward and outward radial vibration and further for providing enhanced cooling over that obtainable in the prior art where the end turns operate at a higher temperature than the windings 16 and 18 within the slots as a consequence the more efficient thermal cooling provided by oil flowing through the slots. The rotor 20 is mounted in hollow shaft which also contains the three phase fullwave rectifier assembly 24 with only the right most extension being illustrated in FIGS. 1 and 2. It should be understood that the exciter generator (not illustrated) in FIGS. 1 and 2 is located to the left and radially outward from the fullwave rectifier assembly 24. A liquid inlet 26 is connected to an inlet manifold 28 connected to one end of the stator 12 for receiving cooling liquid, which preferably is oil, to be circulated through the end turns 22 and windings 16 and 18 and through the slots 14. A liquid outlet 30 is connected to an outlet manifold 32 which is connected to another end of the stator for discharging cooling liquid which has circulated through the end turns 22 and windings 16 and 18.

The embodiments of FIGS. 1 and 2 each have a first annular flow channel connected to the end turns 22 extending from the one end of the stator along the end turns to which the inlet manifold 28 is connected. The flow of fluid into the end turns 22 from the inlet manifold 28 is illustrated by arrows. The flow of cooling liquid through the end turns produces intimate contact with the windings of the end turns 22 including flow between adjacent wires within the first annular flow channel as a consequence of the structure of the first annular flow channel described below in conjunction with the embodiments of FIGS. 1 and 2. The first annular flow channel 34 has an inner axially extending circumferential surface 36 contacting an inner axially extending circumferential surface of the end turns 38. It should be noted that in practice the inner axially extending circumferential surface 36 of the first annular flow channel 34 has been exaggerated to not show actual contact with the axially extending circumferential surface 38 of the end turns 22 for purposes of clarity in the drawings. However, the wedge-shaped member 40 in practice extends axially toward the stator 12 to produce actual contact. The first annular flow channel 34 has an outer axially extending circumferential surface 42 which contacts an outer axially extending circumferential surface 44 of the end turns 22. The combination of the inner and outer axially extending circumferential surfaces 36 and 42 of the first annular flow channel 34 in contact with the inner and outer axially extending circumferential surfaces of the end turns 22 defines the first flow channel so that cooling fluid is directed through the end turns and between the boundaries defined by the inner and outer axially extending circumferential surfaces of the first annular flow channel. A first seal 46 is connected to one end of the stator 12 and contacts the end turns 22 at a point of entry 48 into each slot 14 for preventing fluid flow into the slot from outside the first annular flow channel 34 which insures intimate contact of all of the cooling liquid flowing into the inlet 26 with the end turns to increase cooling efficiency. A second annular flow channel 50 is connected to the end turns 22 from the other end of the stator 12 along the end turns to which the outlet manifold 32 is connected. The second annular flow channel 50 has an inner axially extending circumferential surface 52 which is connected to an inner axially extending circumferential surface 54 of the end turns. The wedge-shaped member 40 has the same exaggerated position in the second annular flow channel 50 as described above with regard to the first annular flow channel 34. The second annular flow channel 50 also has an outer axially extending circumferential surface 56. The inner axially extending circumferential surface 54 and the outer axially extending circumferential surface 56 of the second annular flow channel 50 function to guide cooling fluid through the second channel in contact with the end turns 22 as the fluid flows from the slots 14 toward the outlet manifold 32 to provide efficient cooling of the end turns. A second seal 58 is connected to the other end of the stator 12 and contacts the end turns 22 at a point of entry 60 into each slot 14 for preventing flow from the slot outside the second annular channel. A cylindrical non-conductive magnetically permeable sleeve 62 having a preferred construction, as described below with respect to FIGS. 5-8, is force fit in the annulus of the stator 12 for containing the cooling fluid from flowing into an air gap disposed between the stator 12 and the rotor 20. The sleeve 62 extends outboard from the stator and provides support for the wedge-shaped member 40 which in turn supports the axially extending inner cylindrical surfaces 38 and 54 of the end turns 22 to provide radially inward and outward support against vibration. The cylindrical sleeve 62 has a part 64 which comprises part of the first and second annular flow channels 34 and 50. Thus it is seen that the cylindrical sleeve 62 performs the dual function of providing radial support for the wedge member 40 which in turn supports the end turns 22 and further forms part of the first and second annular flow channels 34 and 50 respectively.

The outer axially extending cylindrical surface of the first and second annular flow channels 34 and 50 has different constructions. As illustrated in FIG. 1, the outer axially extending cylindrical surface 44 is comprised of a collar 66 which has a plurality of sections (not illustrated) to permit placement over the outwardly flaring end turns 22 which has a recess 68 in which a conventional current transformer 70 is held for sensing current flowing in the windings of the stator. It should be understood that in a three phase machine, such as that illustrated in accordance with the present invention, the collar 66 has three recesses 68 respectively holding three different current transformers 70 for sensing the current flow in each of the three phase windings 71, 72 and 74. Winding 76 is the neutral. In the embodiment of FIG. 2, the outward axially extending cylindrical surface 44 of the first annular flow channel 34 and the outward axially extending cylindrical surface 56 of the second annular flow channel 50 is comprised of a heat shrinkable cured circumferential tape 80 wrapped in one or more layers respectively around the outside axially extending circumferential surfaces 42 and 55 of the end turns 22.

The collar 66 and the one or more turns of tape 80 each perform the same function of providing damping against vibration causing radial outward deflection of the end turns 22. As a result of the damping of radially inward and outward vibration produced by the combination of the wedge member 40 and the collar 66 and the wedge member 40 and the tape 80 prevents possible damage to the insulation of the end turns 22 which can cause malfunction or short circuiting leading to a catastrophic failure.

Figure 5:
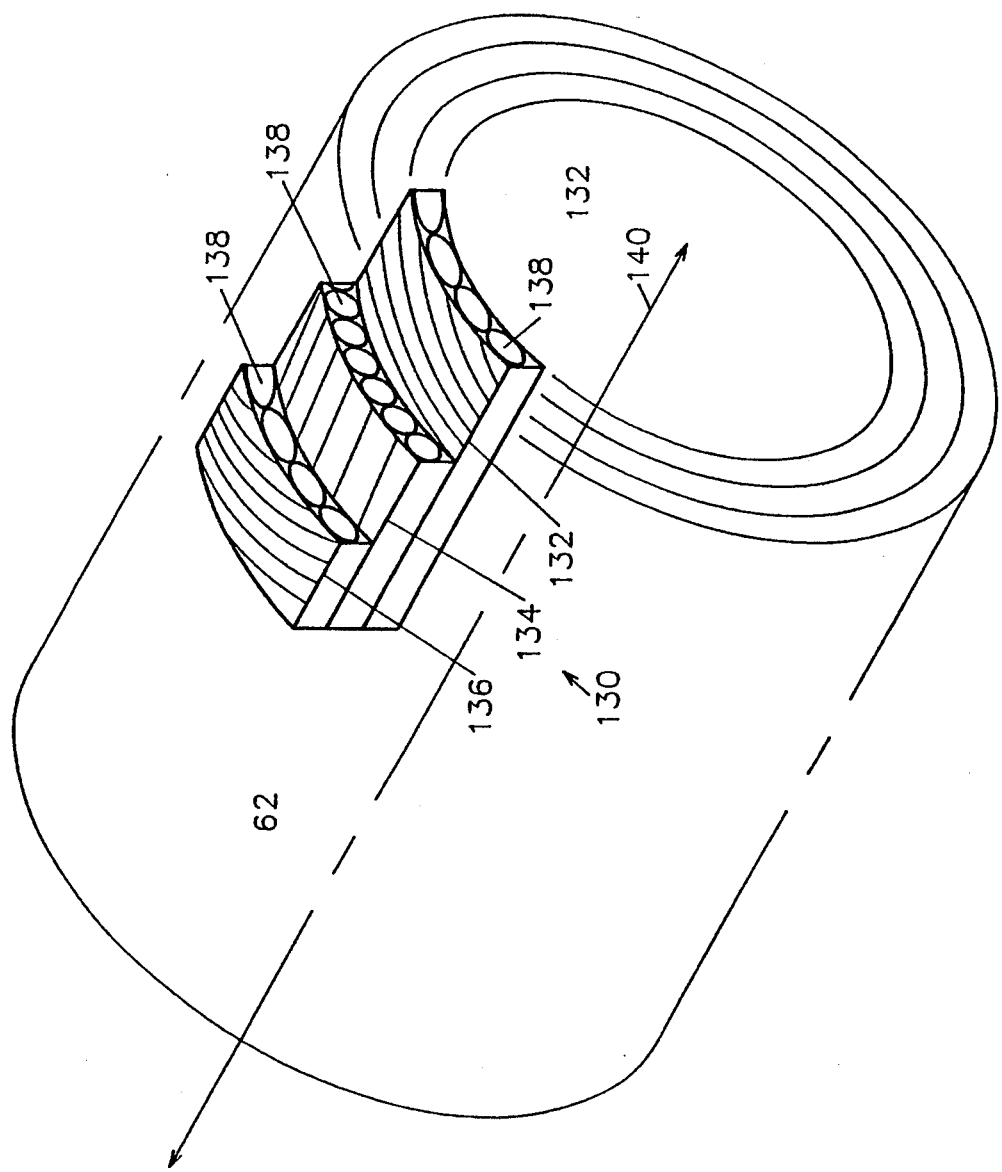
FIG. 5 illustrates a view of a containment sleeve which may be utilized in the embodiments of FIGS. 1 and 2.

FIGS. 5-8 illustrate a preferred embodiment of the cylindrical electrically nonconductive magnetically permeable sleeve 62 of FIGS. 1 and 2. FIG. 5 illustrates a partial sectional view of the laminated polymeric sleeve 62 which is mounted within the annulus of the stator 12 by an interference fit within a cylinder defined by an annulus of the stator. The sleeve has performance characteristics with the coefficient of thermal expansion (CTE) being matched in a radial and axial direction with the coefficient of thermal expansion of the stator 12. A mismatch of CTE's can cause fracture of the sleeve 16 or loss of the interference fit. Fracture results in oil leakage into the air gap. Loss of the interference fits results in the sleeve 62 contacting the rotating rotor 20 leading either to its destruction or to a loss of the sleeve's radial constraint which in turn reduces the sleeve's resistance to buckling under external oil pressure. The sleeve 62 is comprised of a plurality of cylindrical laminations 130 which are preferably performed by wrapping at least three laminations 132, 134 and 136 on a mandrel (not illustrated) which are each comprised of a thermoset fiber reinforced tape. Each lamination contains reinforcing fiber which has a preferred orientation defined with respect to the axis of revolution 140 of the sleeve 116 and axis of rotation of the rotor 20. The fibers 138 of each lamination 132-136 have an orientation defined with respect to the axis 140. A preferred thermoset fiber reinforced tape which is utilized for forming the sleeve is glass fiber epoxy tape. While the construction of the sleeve is not limited thereto, the total thickness of the plurality of laminations 130 may be in the order of 0.030 of an inch with the outer lamination 136 being surface finished to provide a total outside diameter tolerance of ±0.0005 with the relative thickness of the laminants being such that the laminant 134 is 30%-35% of the total thickness with the remaining laminations 132 and 136 being of equal thickness to have a total of 65%-70% of the total thickness measured in the radial direction from an inner diameter to an inner diameter. Circumferential and axial moduli and coefficients of thermal expansion may be as follows. The circumferential modulus may be from 5-6.6 msi and the axial modulus may be from 3.5-4.6 msi. The circumferential coefficient of thermal expansion may be $8-10\times10^{-6}$ in/in/f°.

Figure 6:
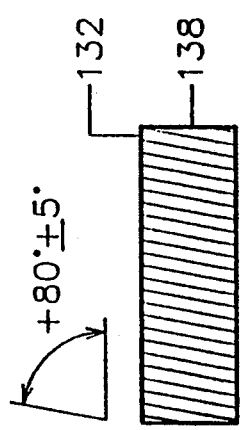
FIGS. 6–8 respectively illustrate different layers of the containment sleeve of FIG. 5.
Figure 7:
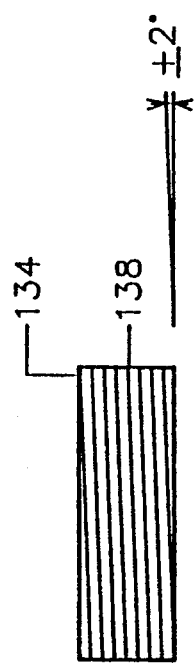
Figure 8:
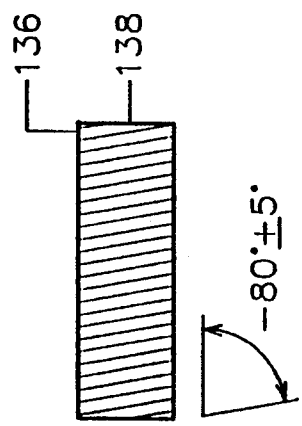

FIGS. 6-8 illustrate a preferred angular orientation of the fibers 138 within the laminations 132-136. The first lamination 132 and the third lamination 136 respectively have the reinforcing fiber 138 within a first range which is exclusive of the angular orientation of the reinforcing fiber 138 within the second lamination 134. The angular ranges are defined with respect to the axis 140 of FIG. 5. The preferred angular range is +80° ±5° and −80° ±5° and the second range is 0 ±2°. The respective order of the first, second and third laminations 132-136 may be changed from that illustrated in FIG. 5.

FIGS. 3 and 4 illustrate a cooling system 200 for use in an exciter generator 202 for use in a self-excited electrical power generator of the type described above with respect to FIGS. 1 and 2 and in use in generating three phase 400 Hz. alternating current in airframes. The cooling system 200 increases the transfer of heat from the rotor 204 of the exciter generator 202 by thermally coupling heat generated by the windings 206 through a thermally conductive path including a thermally conductive sleeve 208 disposed between an inside diameter 210 of the exciter rotor 204 and an outside diameter of a hollow shaft 212 which also contains a three phase full wave rectifier assembly 214 which is of conventional construction. A liquid coolant circuit 216 receives coolant liquid flowing axially through a hollow channel 218 within the hollow cylinder 212. The liquid coolant flows axially along the center of the shaft 212 to a splitter 220 which divides flow between flow axially through the inside 222 of the fullwave rectifier assembly 214 having a plurality of diodes 223 and associated heat sink 224 and flows radially outward to a flow path between an outside surface 226 of the diode assembly 214 and an inside surface 228 of the hollow shaft 212. Heat flux flowing radially inward from the rotor 204 is coupled through the sleeve 208 to the shaft 212 to the inner surface 228 where heat is transferred to the coolant liquid which is preferably oil flowing in the channel defined between the surfaces 226 and 228. The flow at the splitting point 220 flows between channel 240 which couples coolant liquid to the inside of the diode assembly 214 and the channel 242 which couples coolant flow to the channel defined between the outside surface 226 of the diode assembly 214 and the inside surface 228 of the shaft 212. Coolant fluid flows axially along the helical channel 250 which is defined by the helical projection 252 which contacts the inner surface 228 of the shaft 212.

FIG. 4 illustrates the flow path of coolant liquid in the helical channel 250. The channel 242 opens to the outside surface 226 at a series of apertures 260 which connect the channel 242 to the outside surface 226. The coolant liquid flows helically along the channel 250 and enters apertures 262 to flow back inside into the space defined by the inside surface 222 of the diode assembly 214. The flow in the channel 250 is illustrated by the arrows. As a consequence of the high rotational speed of the diode assembly 214, cooler more dense liquid flowing within the helical channel 250 is centrifugally accelerated outward to contact the inner surface 228 of the shaft 212 to promote a high coefficient of heat transfer.

As is apparent, the liquid coolant circuit is bifurcated to provide for heat transfer from within the three phase full wave rectifier assembly 214 and also from the rotor 204 through the sleeve 208 to the hollow shaft 212 where heat is transferred from the inner surface 228 to the fluid flowing in the channel 250.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A cooling system for an exciter generator for use in a self-excited electrical power generator comprising:
   a hollow shaft containing a fullwave diode assembly, for rectifying alternating current produced by an exciter rotor, in thermal contact with the hollow shaft; and
   a liquid coolant circuit for receiving coolant liquid flowing axially along the shaft and splitting flow between flow axially through the inside of the hollow shaft in thermal contact with diodes in the diode assembly and flow radially outward to a flow path between an outside surface of the diode assembly add an inside surface of the hollow shaft axially along the diode assembly to absorb heat generated by the exciter rotor, the coolant circuit further comprising: a flow path extending radially inward from the flow path between the outside surface of the diode assembly and the inside surface of the hollow shaft to the inside of the diode assembly.

2. A cooling system in accordance with claim 1 wherein:

the radially outward flow and the radially inward flow are respectively through apertures disposed at opposed ends of the diode assembly between the inside surface of the diode assembly and the outside surface of the diode assembly.

3. A cooling system in accordance with claim 2 wherein the axial flow path comprises:

a helical flow channel defined by a helical projection extending radially outward from the outside surface which contacts the inside surface of the hollow shaft with one end of the helical flow channel in fluid communication with the apertures receiving the outward liquid coolant flow and another end of the helical flow channel being in fluid communication with the apertures receiving the radially inward coolant flow.

4. A cooling system in accordance with claim 1 further comprising:

a thermally conductive sleeve disposed between an inside diameter of the exciter rotor and an outside diameter of the hollow shaft.

5. A cooling system in accordance with claim 2 further comprising:

a thermally conductive sleeve disposed between an inside diameter of the exciter rotor and an outside diameter of the hollow shaft.

6. A cooling system in accordance with claim 3 further comprising:

a thermally conductive sleeve disposed between an inside diameter of the exciter rotor and an outside diameter of the hollow shaft.

* * * * *